Jan. 16, 1945. J. H. SWEENEY 2,367,243
RUBBER CUTTING MACHINE
Filed April 28, 1943 2 Sheets-Sheet 1
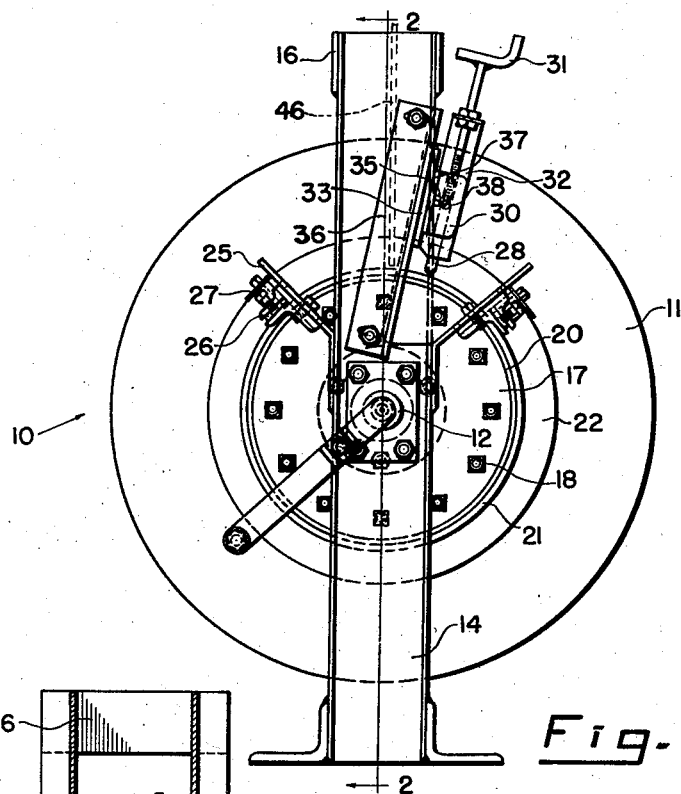
Fig. 1
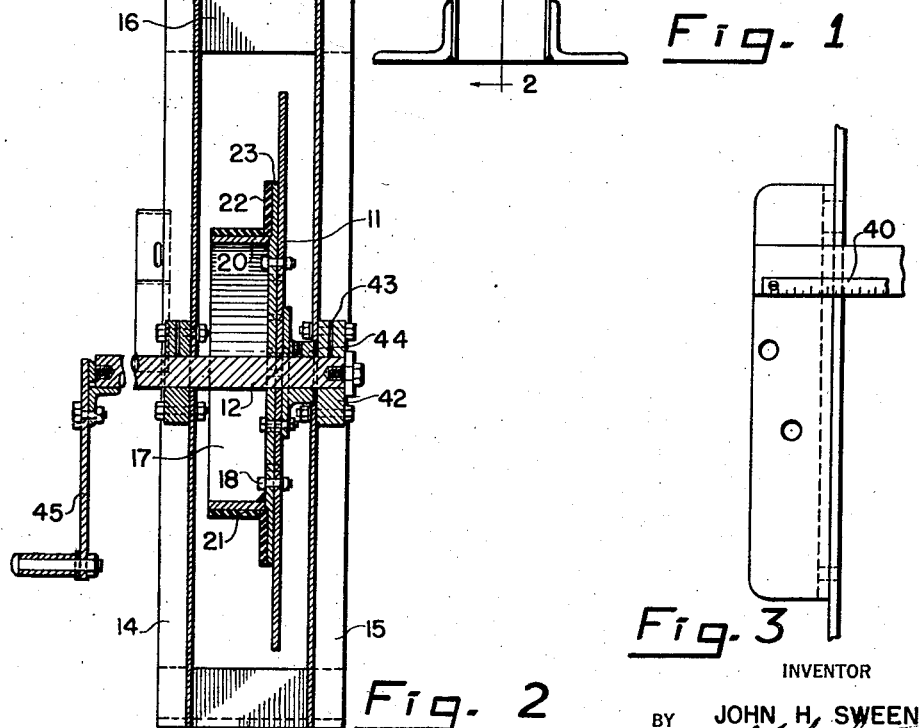
Fig. 2
Fig. 3
INVENTOR
BY JOHN H. SWEENEY
ATTORNEY Jan. 16, 1945.  J. H. SWEENEY  2,367,243
RUBBER CUTTING MACHINE
Filed April 28, 1943  2 Sheets-Sheet 2

INVENTOR
JOHN H. SWEENEY

Patented Jan. 16, 1945

2,367,243

UNITED STATES PATENT OFFICE 2,367,243

RUBBER CUTTING MACHINE

John H. Sweeney, Philadelphia, Pa.

Application April 28, 1943, Serial No. 484,853

2 Claims. (Cl. 164—38)

(Granted under the act of March 3, 1883, as amended April 30, 1928; 370 O. G. 757)

This invention relates to a rubber cutting machine and has for an object to provide a machine especially designed to cut gaskets from stock rubber, which gaskets will be of variable sizes and cross-sections suitable for water-tight doors, hatches, manhole covers, etc., for use on submarines and other vessels.

A further object of this invention is to provide a rubber cutting machine which will handle a piece of rubber stock and quickly and easily cut a gasket of suitable size and shape therefrom.

Still a further object of this invention is to provide a rubber cutting machine which will cut a gasket of a desired uniform size, which machine is adjustable so as to adjust the size of the gasket that may be cut thereon.

Still a further object of this invention is to provide a rubber cutting machine that is adjustable for quickly and accurately cutting an odd size gasket from sheet stock, eliminating the problem either of cutting such gasket by hand, which is necessarily a rough job, or molding the gasket, which consumes considerable time.

With the foregoing and other objects in view, the invention consists in the construction, combination and arrangement of parts hereinafter described and illustrated in the drawings, in which:

Fig. 1 is a side elevational view of the gasket cutting machine of this invention.

Fig. 2 is a sectional view on line 2—2 of Fig. 1, with the handle in vertical position.

Fig. 3 is an elevational view of the plate bracket support and scale, partly broken away.

Figure 4:
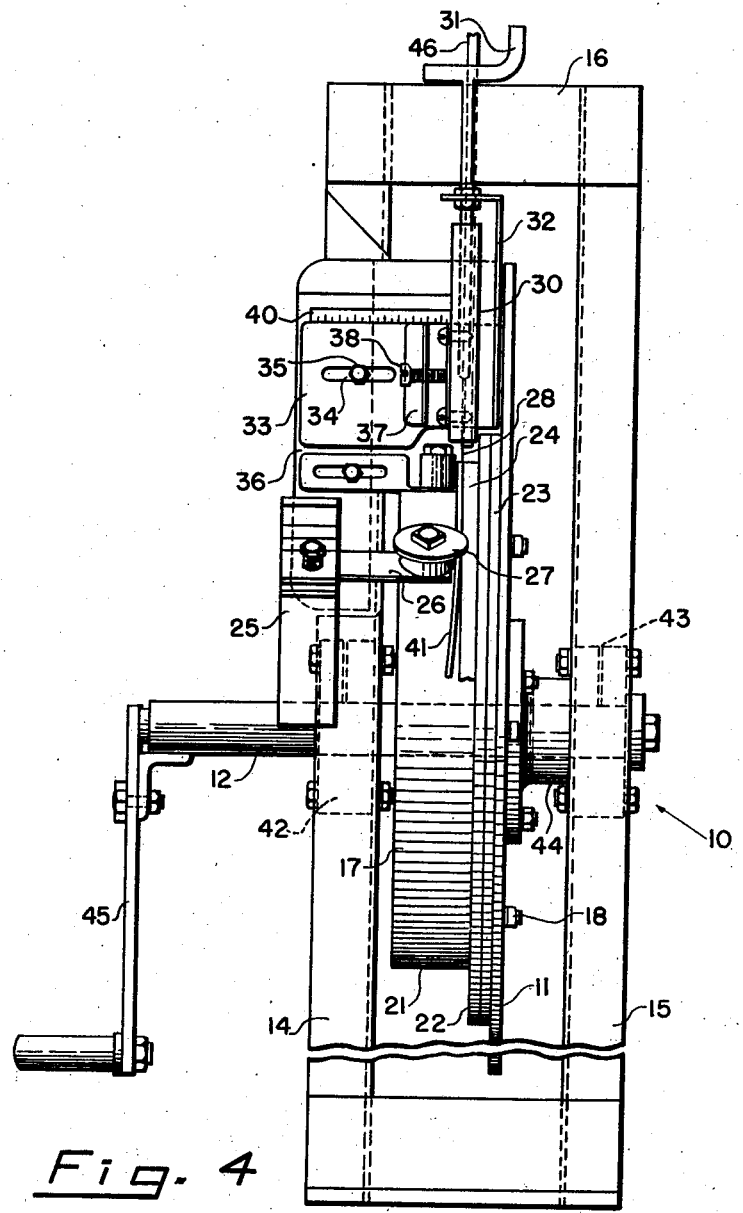
Fig. 4 is a side elevational view on an enlarged scale.

There is shown at 10 the rubber cutting machine of this invention. This machine consists broadly of a rotatable rubber stock carrying wheel 11 secured to a shaft 12 which is journalled between a pair of supporting U-shaped posts 14 and 15, these posts 14 and 15 being secured at their top by a crossbar 16. The wheel 11 has secured thereto a drum 17 as by bolts 18. This drum 17 carries a circular flange 20 on which is mounted a rubber pad 21, while a second pad 22 is cemented against the extending edge 23 of the drum 17. This padded flange 20 provides a seat for receiving the rubber stock 24 during the cutting operations.

Secured to opposite sides of the U-shaped support 14 are a pair of brackets 25 to each of which is adjustably secured an arm 26 carrying a flange roller 27. The rollers are so held by their arms 26 that they will overlap and press down the rubber stock 24 while the cutting therein is being made by means of the adjustably mounted knife blade 28. This knife blade 28 is mounted in a blade holder 30 adapted to be vertically adjusted by means of a feed screw 31 and an angle arm 32. This angle arm 32 is in turn mounted on a plate 33 provided with a slot 34 through which extends a securing bolt 35 to an angle iron 36 mounted on the supporting post 14. A web 37 welded to the plate 33 has a set screw 38 extending therethrough for securing the blade holder 30 in adjusted position. The plate 33 is horizontally adjustable along a scale 40 whereby the width of the cut 41 in the gasket 24 may be determined. The shaft 12 is journalled in bearings 42 through the supporting posts 14 and 15, the bearings 42 being provided with lubrication holes 43. A coupling 44 serves to space the back of the wheel 11 from the back post 15 while an operating crank handle 45 is secured to the forwardly extending end of the shaft 12.

It is obvious, however, that if speedier operation is desired, that a motor of any nature may be utilized to rotate the shaft 12. Similarly, the knife blade bracket supporting plate 33 may be removed and replaced by another identical in construction, except that the angle bracket 32 will be placed along a different edge, thereby enabling the knife blade 28 to make a horizontal instead of a vertical cut in the rubber stock 24. Similarly, the angle arm 32 could be placed diagonally on the supporting plate, and by utilizing a vertical slot in place of a horizontal slot 34 the knife blade could be adjusted to make beveled cuts in the rubber stock 24. The pipe 46 leading from a bucket or other suitable source, is provided for dripping water on the stock as it approaches the cutting blade.

In operation, the stock 24 is placed over the padded drum flange 20 and held in position thereon by means of the rollers 27 which are adjusted to press the stock tightly against the padded back 22. The plate 33 is then adjusted along the scale 40 so as to make a cut of the desired width and the screw feed 31 is rotated to force the blade 28 for the proper depth into the stock 24.

Water pipe 46 is adjusted to drip water on the top of the stock 24 just before it reaches the cutting blade 28 so as to facilitate the cutting. The crank handle 45 is then rotated, drawing the stock 24 around beneath the cutting blade 28 and making the desired cut, thus providing a gasket of the desired width.

Other modifications and changes in the number and proportions of the parts may be made by those skilled in the art without departing from the nature of this invention within the scope of what is hereinafter claimed.

The invention described herein may be manufactured and used by or for the Government of the United States of America for governmental purposes without the payment of any royalties thereon on therefor.

What is claimed is:

1. A rubber cutting device comprising a rotatable rubber stock carrying wheel, a shaft to which said wheel is fixed, means for rotating said shaft, a support on which said rotatable shaft is journalled, a rubber cutting blade adjustably mounted on said support, a feed screw for adjusting the depth of cut of said blade, and transversely adjustable means for mounting said adjustable blade on said support said adjustable position and holding means comprising a pair of brackets, one of said brackets being mounted on said support on one side of said cutting blade, the other of said brackets being mounted on said support on the other side of said cutting blade, and a stock pressing roller adjustably mounted on each of said brackets.

2. A rubber cutting device comprising a rotatable rubber stock carrying wheel, a shaft to which said wheel is fixed, means for rotating said shaft, a support on which said rotatable shaft is journalled, a rubber cutting blade adjustably mounted on said support, a feed screw for adjusting the depth of cut of said blade, transversely adjustable means for mounting said adjustable blade on said support said adjustable position and holding means comprising a pair of brackets, one of said brackets being mounted on said support on one side of said cutting blade, the other of said brackets being mounted on said support on the other side of said cutting blade, and a stock pressing roller adjustably mounted on each of said brackets, one of said rollers being flanged, and a scale on said support for cooperation with said transversely adjustable means to determine the width of cut of said blade.

JOHN H. SWEENEY.